March 7, 1939.   L. J. MISURACA   2,149,618
CUTTING TOOL
Filed Aug. 4, 1936
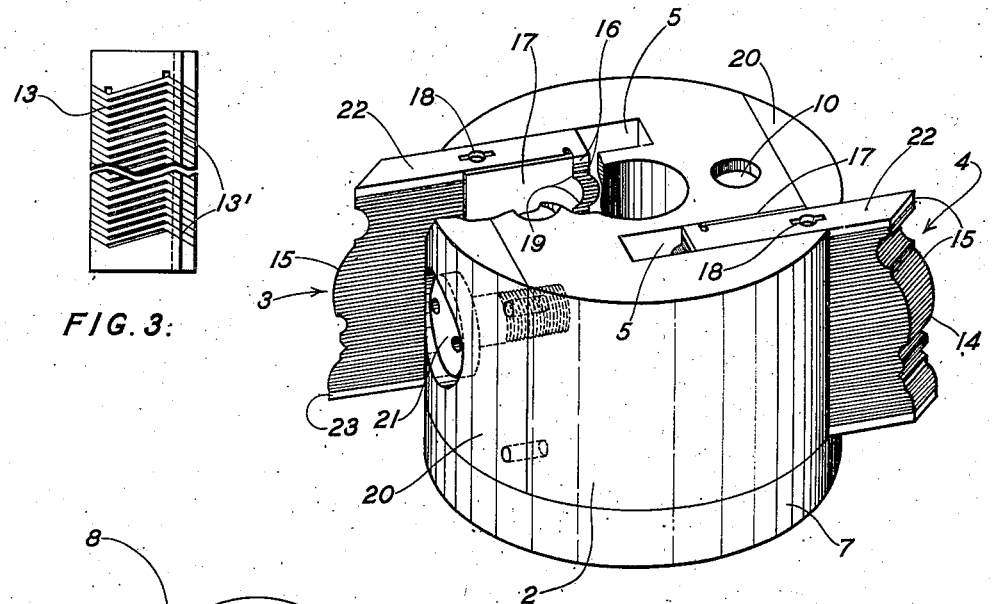
FIG. 3.
FIG. 1.
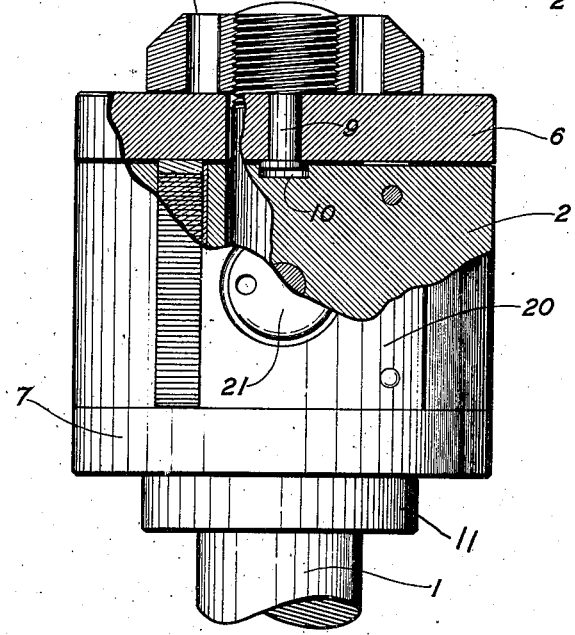
FIG. 2.
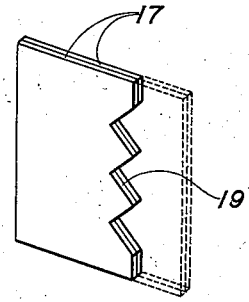
FIG. 4.
INVENTOR.
LOUIS J. MISURACA
BY
ATTORNEY.

Patented Mar. 7, 1939

2,149,618

UNITED STATES PATENT OFFICE 2,149,618

CUTTING TOOL

Louis J. Misuraca, Glendale, Calif.

Application August 4, 1936, Serial No. 94,211

8 Claims. (Cl. 144—218)

This invention relates to and has for an object thereof the provision of a cutting tool for vertical spindle shapers, molding machines, or lathes, which tool may be quickly and easily adjusted to define finished cutting edges of an infinite number of patterns without requiring grinding, filing or treatment of the tool other than adjustment to a predetermined shape.

Another object of the invention is to provide a laminated cutter wherein the laminations are in the form of thin blades independently adjustable to a templet for quickly forming a composite finished cutting edge of a given shape or design.

A further object is to provide a laminated cutter wherein the laminations are of such extreme thinness as to form a cutting edge which does not require filing or grinding to produce practicable results, said laminations being repeatedly usable to define cutting edges of various shapes.

Yet another object is to provide a cutting tool of the character described wherein the laminated cutter is arranged in a body or head together with a templet in such manner that upon rapidly turning said head the laminations will be centrifugally moved into engagement with said templet and pre-sharpened portions of the laminations will be extended to define a cutting edge corresponding to the shape and outline of said templet, following which the laminations are clamped in adjusted positions and the cutter is ready for immediate use.

It is important to note that vertical spindle shapers or molding machines, and like equipment at present available, particularly to wood working amateurs and hobbyists, are provided with fixed form cutters which are limited as to the number of patterns or designs that may be achieved, it being necessary to provide a cutter (or cutters in combination) for each pattern desired. Moreover, if blank knives are to be used, a great deal of skill, care and time are required to grind such cutter blanks to any given pattern and to insure the necessary balance thereof when and to insure the necessary balance thereof when rotated. An expert usually requires several hours to grind a "set up" of a simple pattern and, normally, patterns of fine detail are impossible to achieve in duplicate or require so much time, equipment and skill as to be impracticable. Furthermore, these present methods of providing cutters are costly as the steel used is expensive and each pattern is fixed or semi-fixed.

In consideration of the difficulties experienced in this field it is a primary object of this invention to overcome such objections and to provide a composite cutter wherein the thin blades or laminations may be readily adjusted by the novice to define a finished cutting edge of any pattern or shape, including designs of fine detail, and in a minimum amount of time and at a low cost as against the greater amount of time and expense required to grind and prepare a cutter under the present day method, and without requiring any particular skill or special equipment, it only being necessary to cut with a jig saw or other means a Bakelite, brass or other templet of the desired pattern and then cause the laminations to conform to the templet as hereinbefore noted.

Other objects may appear in the description of my device hereinafter following.

I have shown a preferred form of device embodying my improvements as adaptable to a vertical spindle shaper in the accompanying drawing, subject to modification, within the scope of the appended claims, without departing from the spirit thereof.

In said drawing:

Fig. 1 is a projection of cutters and cutter head constructed in accordance with my invention;

Fig. 2 is a fragmentary side elevation, shown partly in section for clarity of illustration;

Fig. 3 is a fragmentary front elevation of a modified form of cutter, the laminations being shown with an exaggerated thickness for purposes of clarity of illustration, and Fig. 4 is a perspective view of the templet blank showing the manner of cutting the same to form identical templets.

In carrying out this invention, particularly the embodiment thereof shown in detail in the accompanying drawing, I provide upon and adapted for rotation with a spindle 1 of a molding machine or shaper not shown, a cylindrical cutter head 2 having composite or laminated cutters 3 and 4 mounted in slots 5 therein and retractably projecting from the periphery thereof. These cutters are held in place by clamping plates 6 and 7 and a nut 8 which also serves to lock the cutter head or body for rotation with the spindle. It should be noted that the upper plate 6 has projecting pins 9 engaging in recesses 10 in the upper face of the head. The plate 7 rests upon a shoulder or flange 11 on the spindle 1. With these arrangements the clamping action is made positive with relation to the head 2, or the cutters 3 and 4, or both, by causing pins 9 to be in or out of recesses 10 when plate 6 is clamped down. This permits a preliminary position for adjustment of blades. When an extremely wide cut is desired, two or more cutter heads having like pins and recesses with slots 5 pre-alined may be clamped end to end on the spindle whereby to receive composite cutters of cutting capacity greater than that of one head.

While the hereinbefore described arrangement is well suited to this invention it is to be understood that the invention broadly comprehends the provision of a laminated cutter which may be mounted in any form of body or head for similar or other applications and which will consist of a plurality of blades or laminations 14 of such extreme thinness that when portions thereof are extended to define a given shape or pattern said portions will form a finished cutting edge which does not require any grinding or altering and which may be immediately used. I have found that extremely thin blades arranged in the manner herein described will form practically any given cutting edge which will not visibly serrate or mark the work, that is—in which no lands or grooves will be apparent to the unaided eye. Furthermore, these blades may be repeatedly used to form cutters of various patterns without grinding or alteration thereof with the object of achieving such patterns.

One form of laminated cutter which I have found to be satisfactory has extremely thin laminations 14 of elongated and substantially rectangular form and with beveled and sharpened outer ends 15 which define the cutting edge. At their opposite ends these blades have lateral projections 16 which are adapted to engage a templet 17, as will be hereinafter described. I sometimes choose to make blades with some system of longitudinal ribbing or indentation 13, one example of which is illustrated in Fig. 3 of the drawing, for the two fold purpose of increasing the moment of resistance of each blade and to render more difficult the entry between any two blades of wood resins or wood particles or splinters. As shown in Fig. 3 these blades define a finished cutting edge 13'. Furthermore, each blade of whatever character may be provided with an opening 18 of keyhole shape so that when the blades are nested together said openings will aline and permit of the insertion of a suitable tool not shown whereby to lift and maintain the blades as a group in nested formation for cleaning and to facilitate the assembling and dis-assembling of the cutter.

In order to form a cutter of a predetermined pattern it is only necessary to cut with a jig saw or other means not shown, a templet, or templets, such for example as the one 17, composed of two identical and separably united sections, and to move the laminations or blades so that the projections 16 will engage the templet and the blade ends 15 will therefore collectively form a cutting edge following the pattern of the templet, it being understood that said ends of said blades are collectively pre-sharpened.

As here shown, provision is made for effecting the adjustment of the blades by centrifugal action and to this end identical templets are inserted in the slots 5 between side walls thereof and the groups of blades nested together to form the cutter, with the pattern edges 19 of said templets in position to be engaged by the projections 16 of said blades. The templets are held against displacement by means of adjustable plates 20 secured upon the cutter head by threaded fastenings 21, edges of these plates engaging the groups of blades and also the outward edges of said templets, as particularly shown in Fig. 1. Preferably, the groups of blades are each provided with upper and lower clamping blades 22 and 23 corresponding in outline to the blades proper, but somewhat thicker than said blades. These clamping blades strengthen the units and assist in applying thereto the clamping pressure of the plates 6 and 7. Moreover, by using an upper and lower clamping blade of slightly modified thickness for each cutter unit, the dimensional variation being co-relative to the thickness of the thin blades in said unit, I am able to cause the juxtaposition of one cutter unit against the other by the amount of half of the thickness of one thin blade for the entire unit with consequent advantage.

It is desirous of emphasizing the fact that the blades or laminations are exceedingly thin, and in this respect they may be likened to safety razor blades, or thinner, it being noted that the average safety razor blade is approximately six thousandths of an inch in thickness. Blades for use in the cutter of this invention may be readily rolled in ribbon form, surface ground to size by continuous process, then stamped out and stacked in jigs, then ground at the pointed end 15 while nested together as a unit. Subsequent unit sharpening is necessary at end faces only. Blades may be of tungsten-chromium, chrome vanadium, carbon steel, high speed steel, or of cheaper steels —depending upon the requirement. It is found advantageous to increase the frictional co-efficient of their surfaces, and in this respect the uncut but ground ribbon may be subjected to fine sand blasting or acid etch whereby to produce greater resistance to deflection in the blade units. However, the texture of the surface may be quite smooth when viewed by the unaided eye.

It should be noted that I may use straight edged templets of metal standard in order that the outer ends of the blades may be alined for a group sharpening thereof, while nested in the cutter head 2, as may be necessary from time to time.

Inasmuch as the cutter units formed in accordance with this invention will have an equal number of laminations, said cutters will be of equivalent weight and the cutter head will at all times be nicely balanced automatically when assembled and used in accordance with these directions.

When necessary, the groups of blades may be readily removed by the use of the tool not shown and key-hole openings as aforesaid, whereby each unit may be immersed or cleansed in a solvent bath following which the units may be replaced (the head rotated to expel the fluid) and again subject to use in any desired pattern.

In some instances the depth of the cut may be regulated by use of plates 6 and 7 having diameters greater than of the head itself whereby to vary the extension of said plates beyond the periphery of said head, although this may normally be allowed for in cutting the templet.

One of the many uses to which the cutter constructed in accordance with this invention may be put is that of cutting tongue and groove formations for tongue and groove joints. Accurate tongues and grooves may be cut by employing blades of a given thickness, for example—one sixteenth of an inch. This will permit the making of tongue and groove cuts in any desired multiples of one sixteenth of an inch within the scope of the particular machine. In preparing templets for this cutter formation, two templets are made with one cut, one for the tongue and one for the grooves, both halves of the templet being utilized. Owing to the accuracy of the cuts when so using the cutter, no finishing operations are required to insure proper alinement of the tongues and grooves with reference to the outer finished or unfinished surfaces of the work in hand.

What I claim, is:

1. A cutting tool comprising a body, and a cutter composed of a plurality of laminations of approximately safety-razor blade thinness grouped together in said body and independently adjustable thereon so that edges of the laminations will combine to form a smooth completed cutting edge of variable contour.

2. A cutting tool comprising: a body and a cutter composed of a plurality of laminations of extreme thinness nested together in said body and independently adjustable thereon so that the protrusive edges of the laminations will combine to form a completed cutting edge of variable contour, and a templet maintained on said body and arranged to be engaged by said laminations for limiting the adjustment thereof.

3. In a cutting tool, a rotary head, a templet thereon, and a cutter comprising a plurality of independently adjustable blades arranged to be moved against said templet by centrifugal force when said head is rotated.

4. In a cutting tool, a rotary head, a plurality of blades mounted on and arranged to be extended from said head by centrifugal force to collectively form a cutting edge when said head is rotated, and a templet removably fixed on said head and means limiting the extension of said blades therefrom.

5. In a cutting tool, a rotary head, a plurality of laminated cutters extending from the periphery of said head and each comprising a plurality of blades extensible to collectively define a completed cutting edge, each blade having a templet engaging portion and templets mounted on the head and limiting the extension of said blades.

6. In a cutting tool, a rotary head having a slot therein opening upon the periphery thereof, a laminated cutter mounted in said slot and comprising a plurality of relatively adjustable blades having portions extended from said periphery to collectively form a cutting edge, a templet having a pattern edge mounted in said slot, portions on said blades adapted to engage said edge of said templet, and means for holding said blades in adjusted position.

7. In a cutting tool, a rotary head having a slot therein opening at the periphery thereof, a laminated cutter mounted in said slot and extending outwardly from said head, a templet mounted in said slot, each lamination of said cutter having a key hole therein adapted to register with corresponding holes of the other laminations when the laminations are in alignment, to facilitate insertion and removal thereof, a cutting edge on each lamination, and a projection on each lamination adapted to engage said templet.

8. A cutting tool comprising a rotary head, a plurality of cutter laminations independently adjustably supported by said head to collectively define a cutting edge, a templet, means defined by said templet and said laminations for determining the pattern of said cutting edge with said cutting edge exposed for use in said pattern, and means for releasably locking said templet and laminations on said head with said cutting edge exposed for use.

LOUIS J. MISURACA.